United States Patent
Li et al.

(10) Patent No.: US 12,430,795 B2
(45) Date of Patent: Sep. 30, 2025

(54) AUTOMATED WELLHEAD MONITORING USING IMAGING AND COMPUTER VISION

(71) Applicant: Saudi Arabian Oil Company, Dhahran (SA)

(72) Inventors: Weichang Li, Katy, TX (US); Yong Ma, Katy, TX (US); Damian Pablo San Roman Alerigi, Al Khobar (SA); Max Deffenbaugh, Fulshear, TX (US)

(73) Assignee: Saudi Arabian Oil Company, Dhahran (SA)

( * ) Notice: Subject to any disclaimer, the term of this patent is extended or adjusted under 35 U.S.C. 154(b) by 261 days.

(21) Appl. No.: 18/130,315

(22) Filed: Apr. 3, 2023

(65) Prior Publication Data

US 2024/0331190 A1   Oct. 3, 2024

(51) Int. Cl.
| | |
|---|---|
| G06K 9/00 | (2022.01) |
| G06T 7/00 | (2017.01) |
| G06T 7/62 | (2017.01) |
| G06T 7/73 | (2017.01) |

(52) U.S. Cl.
CPC .............. G06T 7/73 (2017.01); G06T 7/0002 (2013.01); G06T 7/62 (2017.01); *G06T 2207/20081* (2013.01); *G06T 2207/20084* (2013.01)

(58) Field of Classification Search
CPC .......... G06T 7/73; G06T 7/0002; G06T 7/62; G06T 2207/20081; G06T 2207/20084; G06T 2207/30164; G06T 7/001
See application file for complete search history.

(56) References Cited

U.S. PATENT DOCUMENTS

| | | | | |
|---|---|---|---|---|
| 11,035,191 | B2 * | 6/2021 | Wernø | E21B 33/0355 |
| 2010/0051286 | A1 * | 3/2010 | Mcstay | E21B 47/135 |
| | | | | 166/368 |
| 2019/0325259 | A1 * | 10/2019 | Murphy | G06F 18/2148 |

FOREIGN PATENT DOCUMENTS

WO   WO-2021076175 A1 *   4/2021   ......... E21B 41/0007

OTHER PUBLICATIONS

Applying Convolutional Neural Networks to Detect Natural Gas Leaks in Wellhead Images, Roberlânio Oliveira Melo et al., IEEEAccess, 2020, pp. 191775-191784 (Year: 2020).*
Use of Computer Vision for Monitoring of Slow Varying Displacements on Subsea Structures, Harald Holden et al., OTC, May 2022, pp. 1-9 (Year: 2022).*
Czimmermann et al., "Visual-Based Defect Detection and Classification Approaches for Industrial Applications—A Survey," Sensors, Mar. 6, 2020, 20(5), 25 pages.

(Continued)

Primary Examiner — Jayesh A Patel
(74) Attorney, Agent, or Firm — Fish & Richardson P.C.

(57) ABSTRACT

A computer-implemented method for automated wellhead monitoring using imaging and computer vision is described. The method includes establishing a baseline for a wellhead using image dimension and perspective calibration. The method also includes constructing at least one computer vision model using images or video from a wellhead database and inputting unseen wellhead images to the trained at least one computer vision model. Additionally, the method includes extracting a wellhead shape and geometric information of the wellhead in the unseen wellhead images and estimating wellhead displacement and growth based on the extracted images.

20 Claims, 14 Drawing Sheets

(56) References Cited

OTHER PUBLICATIONS

Li et al., "Automated Wellhead Monitoring Using Deep Learning from Multimodal Imaging," IPTC-23632-MS, presented at the International Petroleum Technology Conference held in Saudi Aramco, Dhahran, Saudi Arabia, Feb. 12, 2024, 12 pages.
Melo et al., "Applying 1-20 Convolutional Neural Networks to Detect Natural Gas Leaks in Wellhead Images," IEEE Access, Jan. 1, 2020, 8(1):191775-191784, 10 pages.
Minghui et al., "Classification of wellhead device defects based on CNN-GA-BP model," Journal of Magnetism and Magnetic Materials, Apr. 1, 2023, 572:170606, 9 pages.
Zhang et al., "Study of a model of wellhead growth in offshore oil and gas wells," Journal of Petroleum Science and Engineering, Sep. 1, 2017, 158(1):144-151, 8 pages.
International Search Report and Written Opinion in International Appln. No. PCT/US2024/021641, mailed on Jun. 18, 2024, 13 pages.
Darmawan et al., "Wellhead Growth Analysis with Stiffness Method; and Onshore Gas Well Case Study," Jurnal Petro, Oct. 2020, 9(3):125-132, 9 pages.
Dmp.wa.gov.au [online], "Well design and integrity for hydraulic fracturing," Government of Western Australia, Department of Mines, industry Regulation and Safety, 2022, retrieved on May 19, 2022, retrieved from URL <https://www.dmp.wa.gov.au/Petroleum/Well-design-and-integrity-for-25619.aspx>, 7 pages.
Gao et al., "Study on Wellhead Growth in Deep Well," MATEC Web of Conferences, Oct. 2016, 77:06003, 5 pages.
Kim et al., "Unsupervised Learning of Image Segmentation Based on Differentiable Feature Clustering," IEEE Transactions on Image Processing, Jul. 2020, 29:8055-8068, 14 pages.
Liang, "Casing Thermal Stress and Wellhead Growth Behavior Analysis," SPE Asia Pacific Oil and Gas Conference and Exhibition, SPE 157977, Perth, Australia, Oct. 2012, 12 pages.
Qiao et al., "Analysis of the wellhead growth in HPHT gas wells considering the multiple annuli pressure during production," Journal of Natural Gas Science and Engineering., Feb. 2018, 50:43-54, 12 pages.
Rubinstein et al., "Unsupervised Joint Object Discovery and Segmentation in Internet Images," 2013 IEEE Conference on Computer Vision and Pattern Recognition, Portland, Oregon, USA, Jun. 2013, 1939-1946, 8 pages.
Zhao et al., "Object Detection with Deep Learning: A Review," IEEE Transactions on Neural Networks and Learning Systems, Nov. 2019, 30(11):3212-3232, 21 pages.
Zheng et al., "Influence of Cement Return Height on the Wellhead Uplift in Deep Water High-Pressure-High-Temperature Wells," ACS Omega, Jan. 2021, 6(4):2990-2998, 9 pages.

\* cited by examiner

AUTOMATED WELLHEAD MONITORING USING IMAGING AND COMPUTER VISION

TECHNICAL FIELD

This disclosure relates generally to imaging and computer vision based wellhead monitoring.

BACKGROUND

A wellhead includes a system of valves, adapters, and other devices that enable pressure control of a well. The wellhead provides the structural and pressure-containing interface for the drilling and production equipment. Most often the topmost point of a well, the wellhead can experience movement in response to various stresses, forces.

SUMMARY

An embodiment described herein provides a method for automated wellhead monitoring using artificial intelligence. The method includes establishing, using at least one hardware processor, a baseline for a wellhead using image dimension and perspective calibration. The method includes constructing, using the at least one hardware processor, at least one computer vision model using images or video from a wellhead database. Additionally, the method includes inputting, using the at least one hardware processor, unseen wellhead images to the constructed at least one computer vision model. The method includes extracting, using the at least one hardware processor, a wellhead shape and geometric information of the wellhead in the unseen wellhead images. The method includes estimating, using the at least one hardware processor, wellhead displacement and growth based on the extracted wellhead shape and geometric information.

An embodiment described herein provides an apparatus comprising a non-transitory, computer readable, storage medium that stores instructions that, when executed by at least one processor, cause the at least one processor to perform operations. The operations include establishing a baseline for a wellhead using image dimension and perspective calibration. The operations include constructing at least one computer vision model using images or video from a wellhead database. The operations include inputting unseen wellhead images to the constructed at least one computer vision model. The operations include extracting a wellhead shape and geometric information of the wellhead in the unseen wellhead images. The operations include estimating wellhead displacement and growth based on the extracted wellhead shape and geometric information.

An embodiment described herein provides a system. The system comprises one or more memory modules and one or more hardware processors communicably coupled to the one or more memory modules. The one or more hardware processors is configured to execute instructions stored on the one or more memory models to perform operations. The operations include establishing a baseline for a wellhead using image dimension and perspective calibration. The operations include constructing at least one computer vision model using images or video from a wellhead database. The operations include inputting unseen wellhead images to the constructed at least one computer vision model. The operations include extracting a wellhead shape and geometric information of the wellhead in the unscen wellhead images. The operations include estimating wellhead displacement and growth based on the extracted wellhead shape and geometric information.

In embodiments, the wellhead database includes images of wellheads labeled with wellhead segmentation annotations or bounding boxes.

In embodiments, the wellhead shape and geometric information comprises height and width of the wellhead.

In embodiments, the at least one computer vision model is constructed by training supervised segmentation models.

In embodiments, the at least one computer vision model is constructed by training object detection and segmentation models.

In embodiments, the at least one computer vision model is constructed by building unsupervised segmentation models.

In embodiments, dimension and perspective calibration information is determined, and the extracted wellhead shape and geometric information is combined to estimate wellhead displacement and growth.

DETAILED DESCRIPTION

Embodiments described herein enable automated wellhead monitoring using imaging and computer vision. A baseline for a wellhead is established using image dimension and perspective calibration. At least one computer vision model is constructed using images from a wellhead database (e.g., a database include images of wellheads, video of wellheads, or any combination thereof). The wellhead image database includes the images of wellheads labeled with wellhead segmentation annotations or bounding boxes. New wellhead images are input to the constructed (e.g., built unsupervised models or trained supervised models) models. The wellhead shape and geometric information, such as height and width of the wellhead, are extracted from the output of the constructed models. The extracted information is used to detect and/or estimate wellhead displacement and growth.

Figure 1:
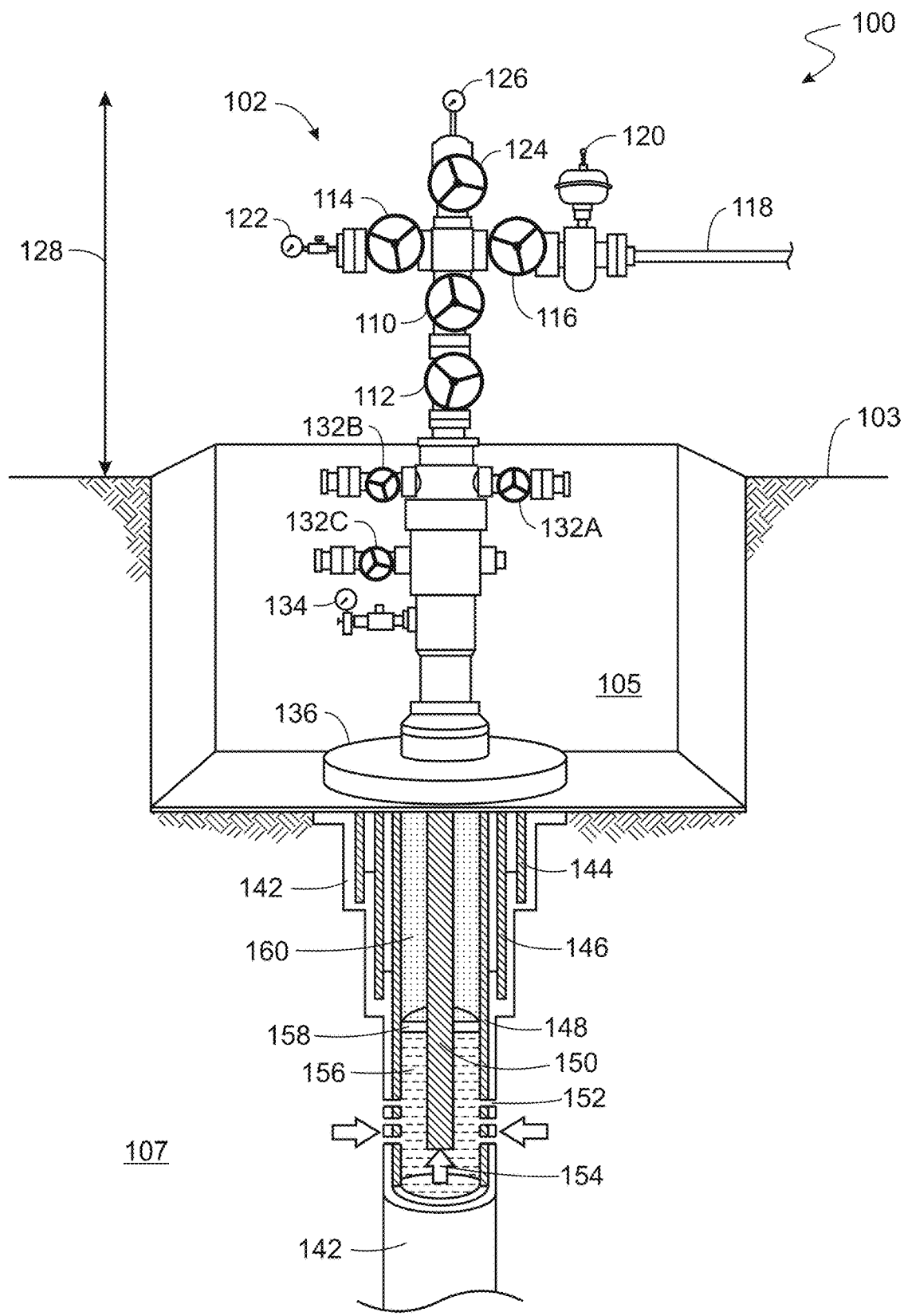
FIG. 1 shows a wellbore.

FIG. 1 shows a wellbore 100. The wellbore 100 is built by drilling a boring into the earth that transports petroleum oil hydrocarbons and natural gas (e.g., reservoir fluid 156) to the surface. The wellbore 100 includes a portion above ground level 103, a portion within a cellar 105, and a portion embedded in the earth, below ground surrounded by rock 107. Cement 142 is poured into the boring to set pipe, tubing, casing strings, and other components that fills the space drilled into the rock. Once hardened, the cement encases the boring which creates a seal so that outside materials cannot enter the well flow, as well as permanently positioning the casings in place. The wellbore 100 produces reservoir fluid 156 via perforations 152 that provide a path for the reservoir fluid 156 to flow from the surrounding rock 107 into the production tubing 150, as shown by the hydrocarbon flow direction 154. Acids and fracturing fluids may be pumped into the wellbore 100 to stimulate the rock 107 to optimally produce hydrocarbons (e.g., reservoir fluid 156).

In the example of FIG. 1, packer fluid 160 is fluid that remains in the annular region of the wellbore 100 between the steel tubing 150 and steel production casing 148 above a packer 158. The packer 158 is a device that is inserted into the wellbore 100 with a smaller initial outside diameter that then expands externally to seal the wellbore 100. In examples, the packer fluid provides hydrostatic pressure to lower differential pressure across the sealing element, lowers differential pressure on the wellbore 100 and casings to prevent collapse, and protects metals and elastomers from corrosion. Above the packer 158, the steel intermediate casing 146 is a casing string that is generally set in place after the surface casing 144 and before the production casing 148. The intermediate casing 146 provides protection against caving of weak or abnormally pressured formations, and enables the use of drilling fluids of different density necessary for the control of lower formations. The steel surface casing 144 is a large-diameter, relatively low-pressure pipe string set in shallow yet competent formations, and provides structural strength so that the remaining casing strings may be suspended at the top and inside of the surface casing.

The cellar 105 is a cavity in which a casing spool and casing head reside. In examples, a first step in preparing the surface for the boring in the earth is to install the cellar 105 as a structural casing. At the bottom of the cellar 105, a conductor casing 136 is set. The conductor casing is the first string set below a structural casing. The conductor casing protects loose near-surface formations and enables circulation of drilling fluid. Casing annulus valves 132A, 132B, and 132C are illustrated. The casing annulus valves 132A-132C control fluid flow in the annular space of wellbore 100. A pressure gauge 134 enables pressure readings at the cellar 105.

The wellbore 100 includes a wellhead 102. The wellhead 102 includes a system of valves, adapters, and other devices that enable pressure control of a well. In examples, the wellhead includes a Christmas tree. For example, valves above ground level 103 are arranged in a crucifix type pattern, and are thus colloquially referred to as a Christmas tree. In some embodiments, a Christmas tree is an assembly of valves, casing spools, and fittings used to regulate the flow of pipes in an oil well, gas well, water injection well, water disposal well, gas injection well, condensate well, and other types of well. For case of description, particular components are described with respect to the wellhead 102. However, the wellhead 102 can include any number of components that regulate the flow of hydrocarbons. In examples, the wellhead 102 includes a frac stack, frac tree, composite frac tree, production tree, and the like.

As shown in FIG. 1, above ground level 103 a number of valves are illustrated. In examples, the valves include varying valve configurations and combinations of manual and/or actuated (hydraulic or pneumatic) valves. As shown in FIG. 1, two lower valves are referred to as master valves, an upper master valve 110 and lower master valve 112. In examples, the depth of the cellar 105 is such that the master valves 110 and 112 of the wellhead 102 are accessible (e.g., can be manipulated) by a human at ground level 103. The master valves 110 and 112 are in a fully open position after completion of the well, and are not opened or closed when the well is flowing (except in an emergency) to prevent erosion of the valve sealing surfaces. In some embodiments, the lower master valve 112 is manually operated and the upper master valve 110 is hydraulically actuated. In examples, the upper master valve 110 is controlled from a remote location and enables remote shutting in of the well in the event of emergency.

The wellhead 102 includes a kill wing valve 114 and a flow wing valve 116. In some embodiments, the wing valves 114 and 116 are hydraulically actuated. The flow wing valve 116 enables hydrocarbons to flow from the well, to a flowline 118. The flowline 118 defines the path that the hydrocarbons take to production facilities (or the path water or gas will take from production to the well in the case of injection wells). An emergency shutdown device 120 can be used to remotely shut in the well in case of an emergency. In examples, kill wing valve 114 is used for injection of fluids such as corrosion inhibitors or methanol to prevent hydrate formation. In some embodiments, the kill wing valve 114 is manually operated. As shown in FIG. 1, a pressure gage 122 at the wellhead 102 can be used to monitor pressure at the wellhead.

The wellhead 102 also includes a swab valve 124 that is used for well interventions like wireline and coiled tubing. For such operations, a lubricator is rigged up onto the top of the tree and the wire or coil is lowered through the lubricator, past the swab valve 124 and into the well. In examples, the swab value is manually operated. A needle valve 126 is used to start, stop, and regulate the flow rate at the wellhead. In some embodiments, the needle valve 126 enables rigging down equipment from the top of the wellhead 102 with the well flowing while ensuring two barriers separate hydrocarbons from the swab valve 124.

Wellheads (e.g., wellhead 102) are a critical part of oil/gas/geothermal drilling, completion and production systems, acting as both the structural and pressure containing interface. As shown in FIG. 1, the wellhead 102 consists of equipment mounted at the opening of the well to regulate and monitor hydrocarbon extraction from subsurface formation, and typically includes three components: the casing head, the tubing head, and the Christmas tree. In examples, the casing head is at the bottom fitted with valves and plugs to give access to the casing. The tubing head is used to position the tubing correctly in the well, and provides reliable well access. Sealing the well enables Christmas tree removal with pressure in the casing. In examples, the Christmas tree, typically composed of a master gate valve, a pressure gauge, a wing valve, a swab valve, and a choke and a number of check valves, provides production operation control and monitoring. The wellhead 102 provides casing and tubing suspension, and a means to attach a blowout preventer during drilling to avoid high pressure formation induced blowouts.

During the well service life, the wellhead may undergo movement and displacements, often visually observed as a height change (e.g., growth) of the wellhead compared with a previous position. This can be caused by a host of factors including static, thermal, and pressure induced complex wellhead loadings. In some embodiments, the wellhead 102 undergoes growth due to pressure and loadings at the various components described in FIG. 1 as built into the wellbore 100. Wellhead growth caused by temperature and pressure effects during production could be severe and critical, causing well integrity failure and surface equipment damage, sometimes with catastrophic consequences at huge safety risks and economic losses. Being able to detection, quantify and mitigate displacement can have significant economic and safety impact to production fields. In some embodiments, wellheads are monitored by inputting images or video of the wellhead into a model trained to extract information from the images or video to detect and/or estimate wellhead displacement and growth. For ease of description, the present techniques are described using images to estimate wellhead displacement and growth. However, video or frames of video are used to estimate wellhead displacement and growth in a similar manner as images. In response to the estimated displacement and growth, a model correlating displacement/growth with production data is constructed to predict growth/displacement of a wellhead or its trend based on the drilling/completion/production data. Preventative actions are taken to mitigate the predicted growth/displacement. In examples, the predictive actions are applied to the various components at the physical wellbore as described with respect to FIG. 1.

Figure 2:
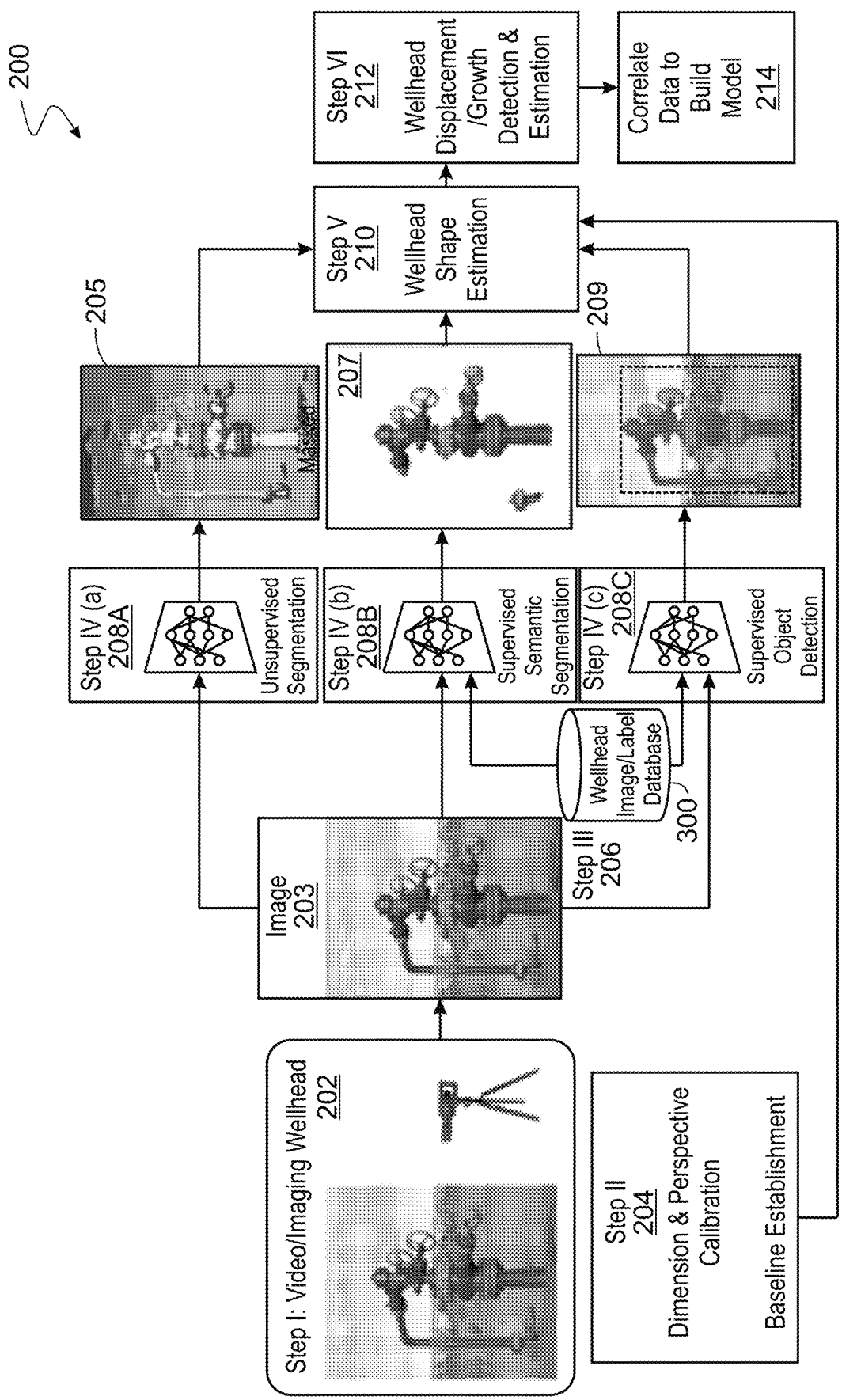
FIG. 2 shows a workflow for automated wellhead monitoring

FIG. 2 shows a workflow 200 for automated wellhead monitoring. In some embodiments, the present techniques include imaging systems and computer vision based methods for automated wellhead equipment health monitoring, notably wellhead displacement or growth detection and quantification. The system consists of a high-resolution camera or a number of these cameras photographing or video recording the wellhead equipment, with optical and/or multispectral imaging band such as infrared. The captured wellhead imagery or video is then input into a computer vision system for analysis to determine the wellhead health condition such as the amount of displacement or growth, using machine learning techniques.

Specifically, as shown in FIG. 2, the workflow consists of the following steps. At reference number 202, one or a number of optical or multispectral cameras are used to capture images or video of wellhead equipment continuously at a well site. Images or video 203 of the wellhead are obtained. At reference number 204, image dimension and perspective calibration is performed to establish a baseline prior to wellhead displacement. In examples, the baseline is a starting measurement or position of the wellhead. The baseline is extracted from the initial images, the initial video, or an initial combination of images and video of the wellhead.

At reference number 206, a wellhead image/label database 300 is constructed. The wellhead image/label database is further described with respect to FIGS. 3 and 4. In examples, the wellhead image/label database 300 includes a whole or a subset of the images that are labeled with wellhead segmentation annotations or bounding boxes. Computer vision models 208A, 208B, and 208C are constructed (collectively referred to as computer vision models 208). In examples, constructing the computer vision models includes building unsupervised models, training supervised models, any combinations thereof. The computer vision models 208 include an unsupervised segmentation model 208A, a supervised semantic segmentation model 208B and object detection and segmentation models 208C. In some embodiments, the models are constructed using the previously constructed wellhead image/label database 300. The constructed and validated models are applied to new (e.g., unseen) wellhead images or video for segmentation and object detection for wellhead equipment. The computer vision models output images 205, 207, and 209. In some embodiments, models are customized by constructing models using baseline images of a well, and applying the model to unseen images of the same well.

At reference number 210, the wellhead shape and its current geometric information is estimated. The current geometric information includes height and width of the wellhead. In examples, the wellhead shape and its current geometric information is estimated from one or more images 205, 207, and 209 output by the computer vision models 208. At reference number 212, wellhead displacement/growth detection and estimation is performed. At reference number 214, an observed trend in wellhead displacement/growth is correlated with drilling/completion/production data such as pressure and temperature to develop a prediction model. In examples, the prediction model outputs wellhead growth/displacement or its trend based on drilling/completion/production data of a well. In examples, the wellhead displacement/growth is compared to a generally accepted range of displacement/growth, which can be field specific. The comparison is used to determine if preventative actions are implemented at the well. For example, offshore wells might have a larger range of values when compared to wells land. In some embodiments, the generally acceptable range is a user adjustable range consisting of a lower threshold and a max value. Accordingly, the workflow 200 enables detection of potential wellhead growth/displacement in real-time or close to real time when the camera captures new image frames, which are then compared against with the baseline image which has no growth. Images are capture at multiple time stamps to construct computer vision models. The prediction model (e.g., reference number 214) predicts wellhead displacement and growth, without capturing new images. In examples, the prediction model forecasts the wellhead displacement and growth based on well and field specific data.

Referring again to reference number 202, in examples, images, video, or any combinations thereof are captured. The images and video include wellhead equipment at the wellsite. In some embodiments, the images or video are captured using one or more cameras, including optical and/or multispectral cameras such as infrared cameras, hyperspectral cameras, and the like. In some embodiments, the images or video are in a red-green-blue (RGB) format. Multispectral imaging, such as infrared based imaging, captures data that varies according to temperature of the wellhead equipment. The relationship between the well head displacement/growth and temperature variations on the wellhead equipment is derived from multispectral images. Based on conditions at the wellsite, the one or more cameras are installed at a distance d meters from the wellhead, ensuring that the field of view in the images or video covers the entire wellhead.

In examples, the choice of distance d, field of view L and image pixel size (pixel pitch) dx is selected such that the image or video pixels correspond to a dimension at a fraction of the desired wellhead displacement/growth resolution dH. For example, suppose the wellhead's physical height is H meters and its image is of N pixels, then each pixel's corresponding physical dimension is H/N. For image or video capture, each pixel's corresponding physical dimension is less than the desired wellhead displacement resolution divided by the fraction, such that:

$$H/N < dH/k,$$

where dH is the desired wellhead displacement resolution and 1/k is the desired ratio. In examples, the choice of k is associated with a ratio (fraction) of the imaging pixel size relative to the desired displacement resolution. For example, at k=2, it means the imaging pixel size is half of the desired wellhead displacement resolution. Note N=h/dx, where h is the image or frame size of the wellhead in meters. Therefore, H/h<dH/(kdx). The following imaging formula is used:

$$H/h = (d-f)/f$$

where f is the focal length of the lens. This results in the following:

$$d < f[dH/(kdx) + 1]$$

Accordingly, in an example with dH=1 mm, dx=4 um, k=2, and f=100 mm, the resulting distance is d<12.6 m. In examples, the overall imaging resolution of such a setup is much higher than the pixel pitch, but that can vary depending on the imaging wavelength and aperture sizes, etc.

Referring again to reference number 204, image dimension mappings are determined, perspective calibration is performed, and a baseline is established. As described herein, a baseline refers to baseline images or video of a wellhead. In some embodiments, the baseline is established prior to wellhead displacement/growth. Due to the high resolution requirement of detecting and estimating wellhead displacement/growth, setting up the imaging system with the right imaging coverage and perspective enables capture of an accurate baseline against which future captured images or video can be compared to determine potential wellhead movement. Once the camera distance from the wellhead has been determined, the image dimension is calibrated to establish an accurate mapping between the physical dimension of the wellhead equipment and the corresponding imaged object. Once calibrated, this can be used to map newly acquired images back into the physical domain.

Perspective calibration sets a spatial relationship between the imaging plane and a direction associated with the wellhead. In examples, the imaging system is calibrated such that the imaging plane is parallel to that of the vertical direction 128 of the wellhead 102, instead of having any tilted angle. In the latter case, the vertical and horizontal pixel pitch might correspond to physical dimension differently. To calibrate the perspective of the camera with respect to the wellhead, a benchmark object on the wellhead is selected, and the dimension and aspect ratio of the image is examined based on the benchmark object to adjust the camera angle till the dimension and aspect ratio are consistent with the benchmark object. For example, the benchmark object is a scale, ruler, or other measurement device that provides an indication of units of measure with respect to components of the wellhead. The benchmark object has a known physical dimension and aspect ratio (such as such as a scale or a wrench). The image output from the camera is calibrated as described above using the benchmark object, and camera is expected to produce the known physical dimension and aspect ratio of the benchmark. Once calibration is complete, the ratio between a physical dimension of the benchmark object with an image dimension of the image is recorded. In examples, the ratio is used to convert future images into the physical domain. After calibration is complete, a baseline image or video without displacement/growth is captured so that future processed images or video of the wellhead can be compared with the baseline to determine potential displacement/growth.

Referring again to reference number 206, a wellhead image/label database 300 is constructed where the whole or a subset of the images are labeled with wellhead segmentation annotation or bounding boxes. The labeled images are used to train one or more computer vision models 208. For computer vision models such as a supervised semantic segmentation model or supervised object detection model, a large number of image samples with labels or annotations are used to construct (e.g., train) an accurate model. In examples, the labels are segmentation masks covering the wellhead in the image or the bounding boxes tightly enclosing the wellhead. Segmentation masks are used as labels to train supervised semantic segmentation models. Bounding boxes tightly enclosing the wellhead as used as labels to train supervised object detection models.

In some embodiments, graphical image annotation tools are used to implement the labeling process. Graphical image annotation tools include open source tools that build a large database of annotated images obtained from many contributors. In examples, the graphical image annotation tool is a python based image polygonal annotation tool. In some embodiments, the label tool enables annotation of pixel regions belong to one of the classes by enclosing them via polygons. The points defining each polygon and the class label for the pixels inside that polygon are then output in a JSON file, and then converted into a mask image of the same dimension as the respective image. In the mask image, the pixels in each polygon region take the numerical values defined by the class mapping ["_background_": 0, "wellhead": 1].

Figure 3:
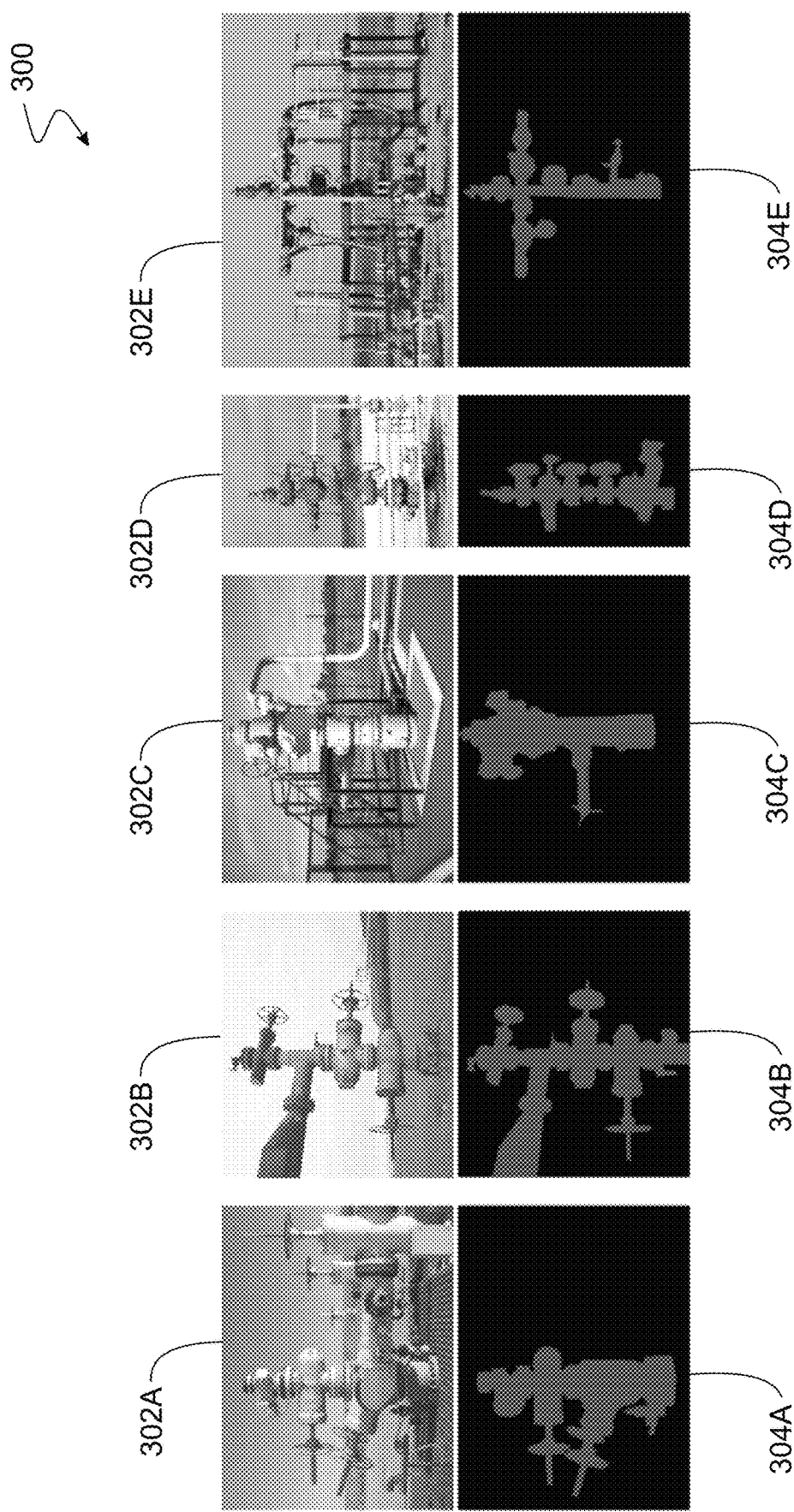
FIG. 3 shows an example wellhead image/label database.
Figure 4:
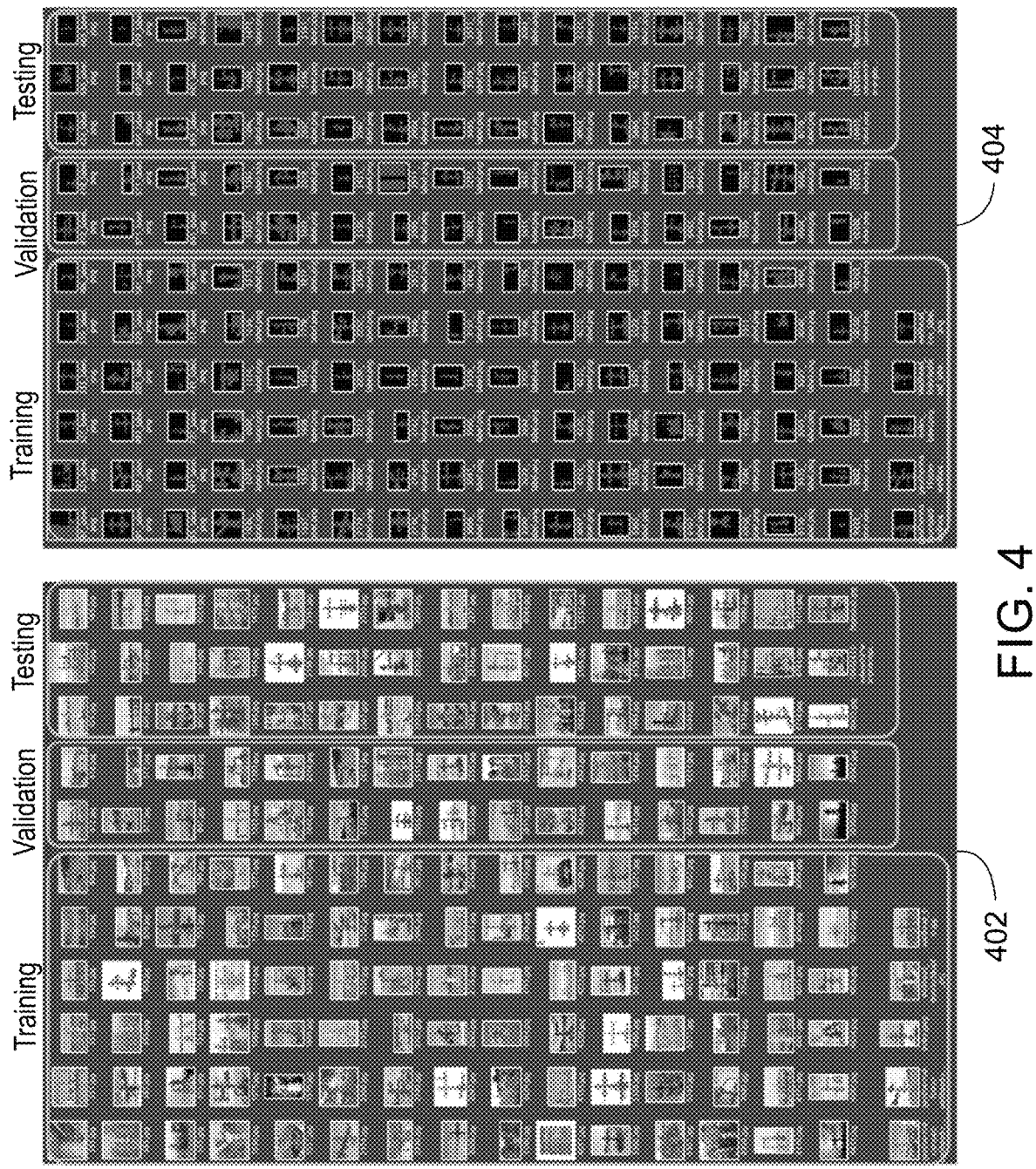
FIG. 4 shows samples partitioned into training, validation, and testing data subsets.

FIG. 3 shows an example wellhead image/label database 300. As shown in FIG. 3, the wellhead image/label database 300 includes several examples of wellhead images 302A-E and the corresponding wellhead label mask images 304A-E. For ease of illustration, a finite number of wellhead images and wellhead label mask images are shown. However, the wellhead image/label database includes numerous samples. In the mask images 304A-E, black color represent the background while white corresponds to the wellhead equipment. In some embodiments, a sample of the wellhead image/label database 300 refers to an image and the corresponding mask image. Samples in the wellhead image/label database 300 are separated into training/validation/testing subsets. In examples, the training/validation/testing subsets correspond to, for instance, 65%, 15% and 20% the wellhead image/label database 300. FIG. 4 shows samples partitioned into training, validation, and testing data subsets. In the example of FIG. 4, training, validation, and testing images are shown at reference number 402, and training, validation, and testing masks are shown at reference number 404. The samples can be partitioned in a random shuffling of the index and then dividing them into a specified ratio. In examples, care is taken so that a balanced representation of various characteristics of these wellhead images is ensured in the training, validation and testing sets, including the characteristics of both the background and the wellhead color, shape, orientation, etc.

Referring again to FIG. 2, computer vision models 208 are constructed. The computer vision models 208 include unsupervised segmentation models 208A, supervised semantic segmentation 208B, and object detection and segmentation models 208C. The computer vision models 208 are constructed using the previously constructed wellhead image/label database 300. The trained and validated computer vision models 208 are applied to new wellhead images or vision for segmentation and object detection for wellhead equipment. The new images or vision are unseen images or video of a wellhead.

To construct unsupervised segmentation models 208A, joint co-segmentation methods are used. Since the images and video in the wellhead image/label database 300 contain wellheads as main objects, the images or video of the wellheads share similar characteristics when compared to potentially very different backgrounds. Joint co-segmentation methods are applied, where segmented classes in the images or video are sorted and compared across different images or video to identify images and video with common characteristics and differentiable feature clustering. In examples, pixels of the images are grouped in clusters which can then be mapped into semantically meaningful classes such as background and wellhead equipment with via post-processing. The labeled images are used to produce the semantically meaningful classes.

Figure 5:
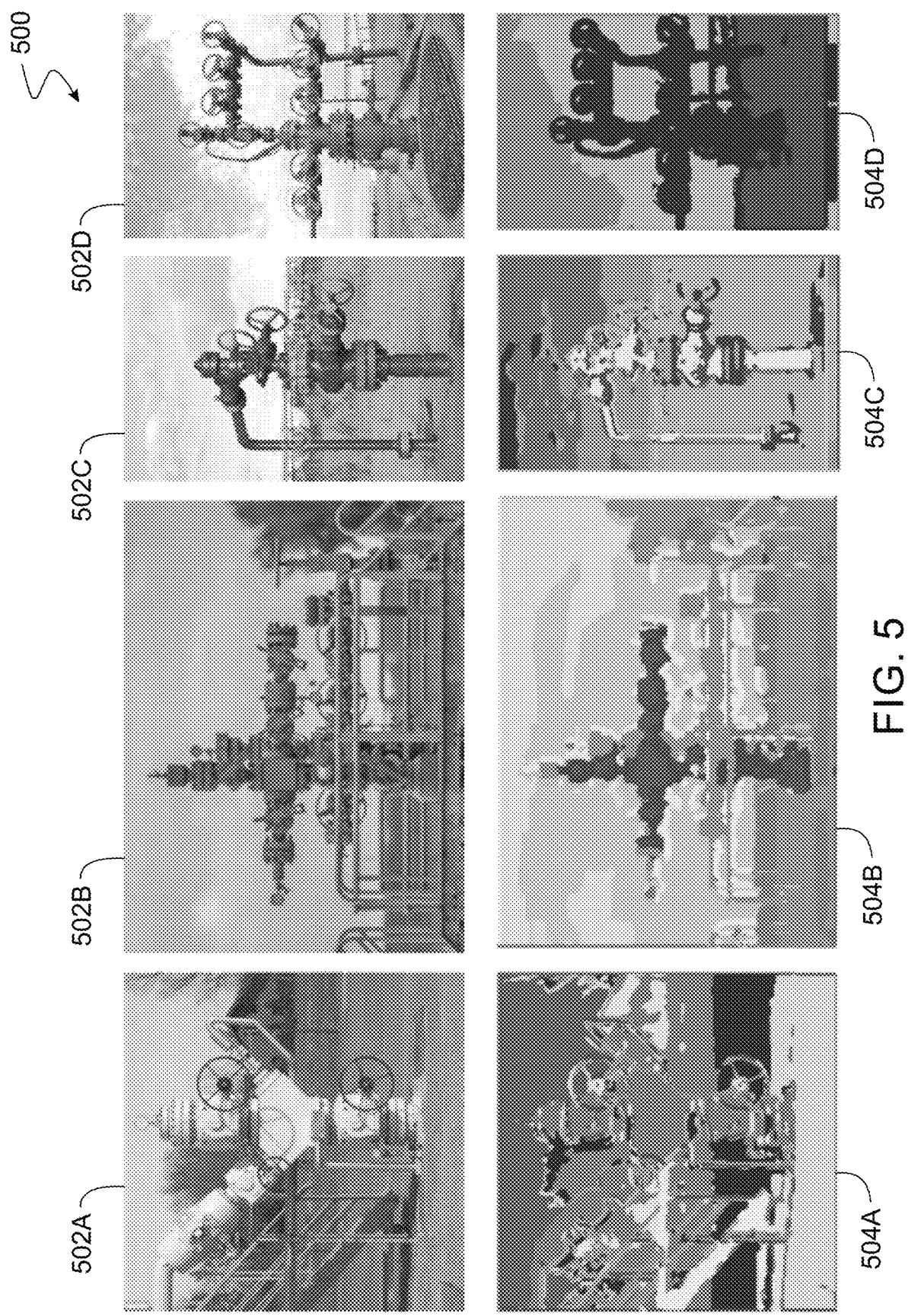
FIG. 5 shows an output of an unsupervised segmentation models.
Figure 6:
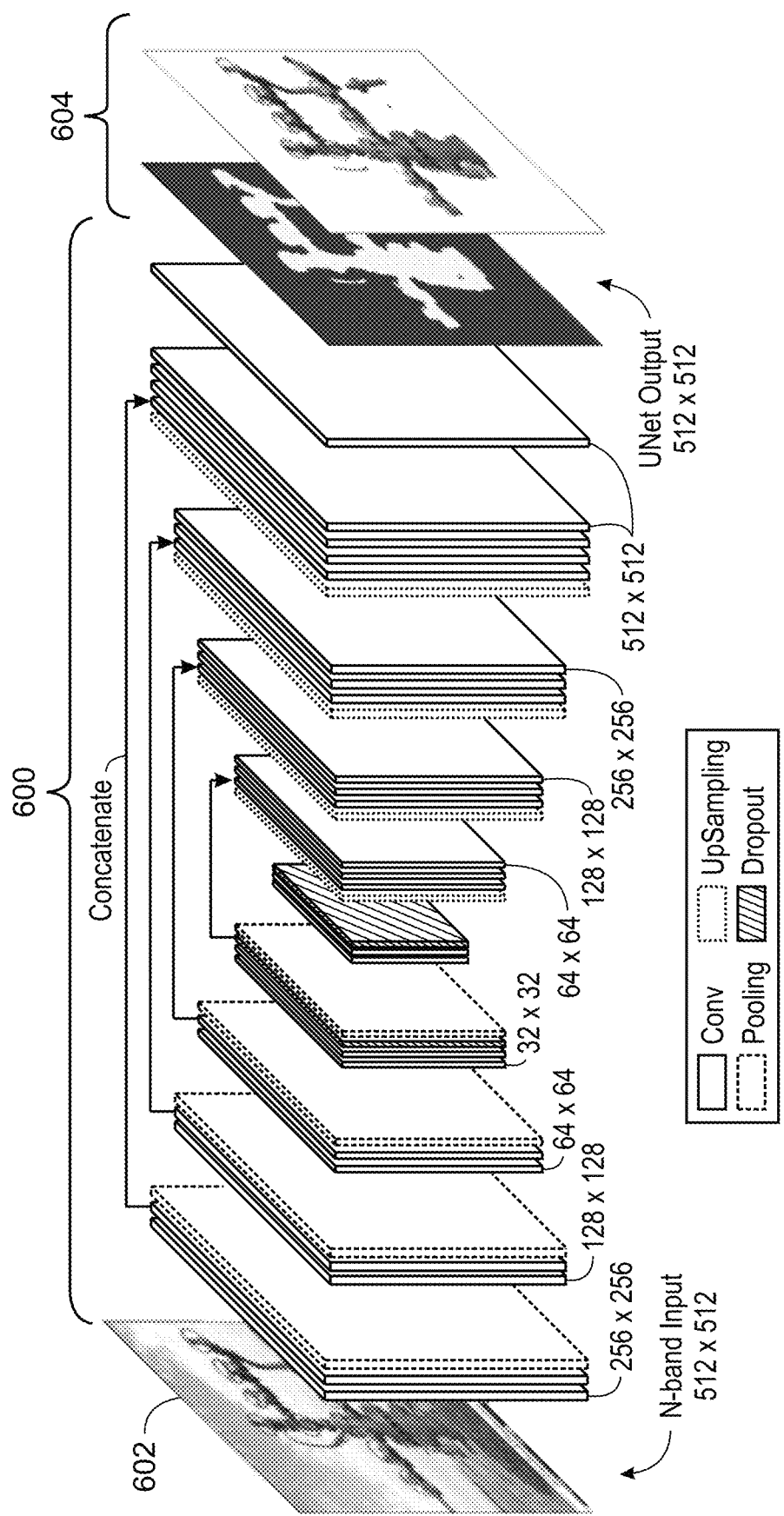
FIG. 6 shows a supervised semantic segmentation model.

FIG. 5 shows an output of an unsupervised segmentation models 208A. In the example of FIG. 5, examples of input wellhead images 502A, 502B, 502C, and 502D and their corresponding output, unsupervised segmentation output 504A, 504B, 504C, and 504D. In examples, the unsupervised segmentation output is a masked image (e.g., image 205 of FIG. 2). In examples, the masked image includes different blocks each corresponding to different clusters. As shown, the wellhead equipment (e.g., wellhead 102 of FIG. 2) in each input/output pair are well segmented and can be extracted to derive shape and geometric information in the subsequent steps to be described below. For example, the segmented results are consistent with true label, although unsupervised segmentation does not use labels for model construction. Additionally, the wellhead equipment is separated (e.g., extracted) from the rest of the images Referring again to FIG. 2, supervised semantic segmentation models 208B are shown. In examples, supervised semantic segmentation is implemented via network architectures that enable semantic or instance segmentation. FIG. 6 shows a supervised semantic segmentation model 600. In examples, the supervised semantic segmentation model 600 is a convolutional neural network. In examples, the supervised semantic segmentation model 600 is a U-Net model. The supervised semantic segmentation model 600 FIG. 6 takes as input an input image 602 and outputs mask images 604. In examples, the supervised semantic segmentation output is a masked image (e.g., image 207 of FIG. 2). The supervised semantic segmentation model 600 includes four types of layers: (i) the convolutional layer; (ii) the pooling layer; (iii) the upsampling layer; and (iv) the dropout layer. The supervised semantic segmentation model 600 cascades an encoding path and decoding path between which the corresponding layers are concatenated via skip connections. The input image 602 to the supervised semantic segmentation model 600 is each one of the patch core image and the output is the prediction of the corresponding mask image 604 which specifies the class label for each pixel. The training process optimizes the network connection weight coefficients throughout all layers such that the difference between the predicted label mask and the true labels are minimized, averaged over all the training samples.

In some embodiments, a model loss of the supervised semantic segmentation model is defined as the sum of the weighted Dice loss La and the categorical focal loss La, given in the following:

$$L_d = 1 - 2 \frac{\sum_{l \in L} \sum_{i \in N} y_i^{(l)} \hat{y}_i^{(l)} + \varepsilon}{\sum_{l \in L} \sum_{i \in N} (y_i^{(l)} + \hat{y}_i^{(l)}) + \varepsilon}$$

$$L_{f1} = -\sum_{i=1}^{c} (1 - y_i)^\gamma t_i \log(y_i)$$

where $y_i$ and $\hat{y}_i$ are the probability of the ground truth and the predicted class probability, respectively. The focal loss $L_{fl}$ down-weights the contribution of easy examples and enables the model to focus more on learning hard examples. It works well for highly imbalanced class scenarios. The Dice loss La is derived from the Dice coefficient which is widely used metric in computer vision community to calculate the similarity between two images.

Figure 7:
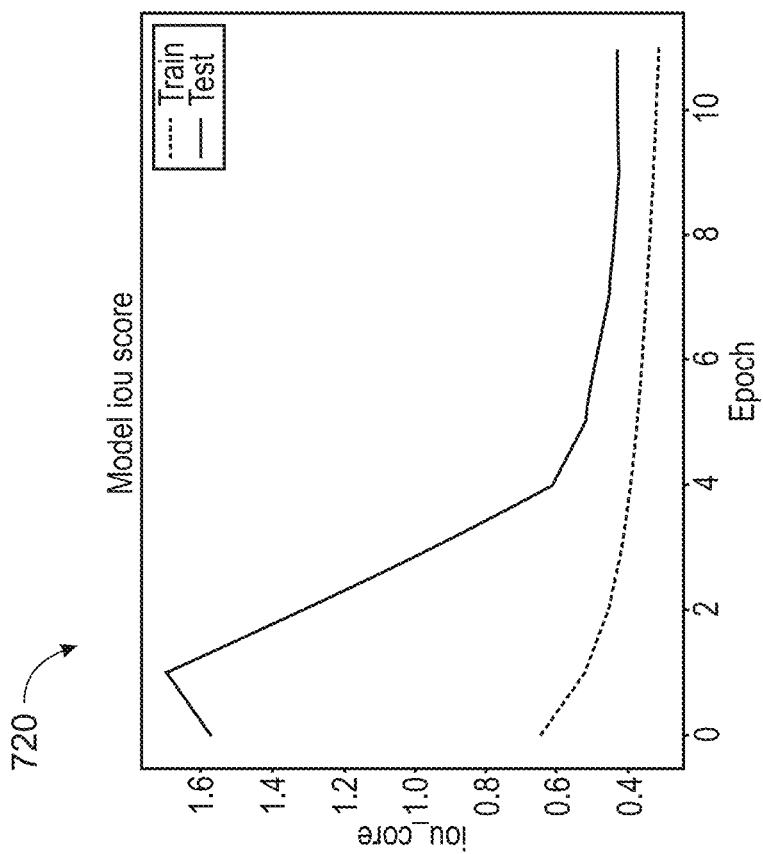
FIG. 7 shows training and validation performance in terms of Intersection over Union (IoU) scores and the model losses.
Figure 7:
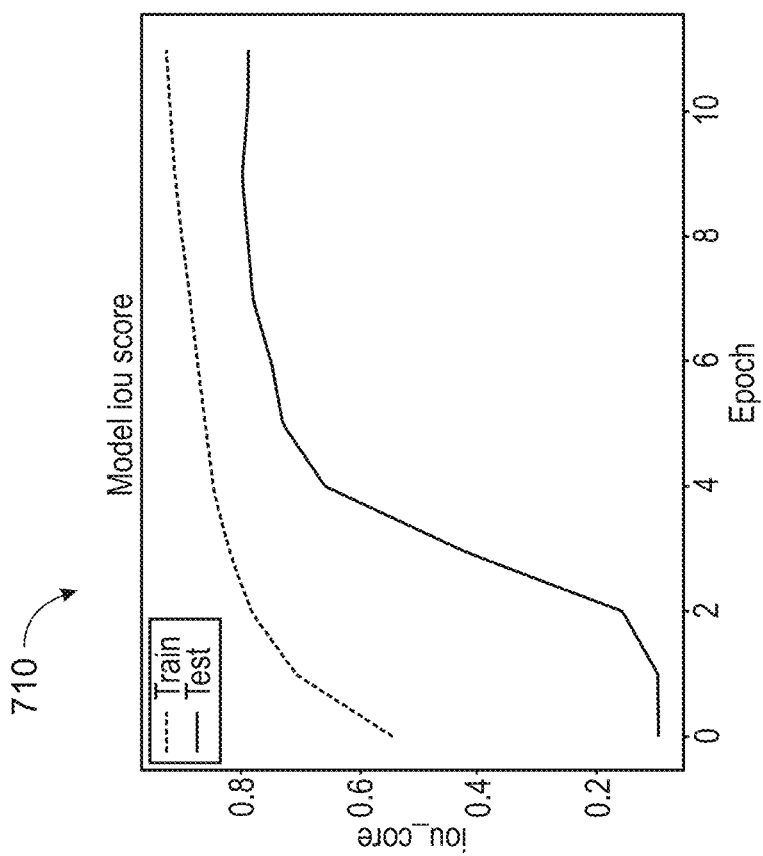

FIG. 7 shows training and validation performance in terms of Intersection over Union (IoU) scores and the model losses. The model evaluated by the plots of FIG. 7 may be, for example, the supervised semantic segmentation model 600 of FIG. 6. For a performance metric, the IoU and the F-score are determined. In examples, FIG. 7 shows quantified training and validation performance in terms of an IoU score 710 and the model loss 720. In some embodiments, the training process is stopped when the training and testing/validation loss begin to bifurcate. In examples, the training loss begins to descend and the testing/validation loss plateaus, signaling a stop to model training. Using the example network 600 of FIG. 6, training is stopped at epoch 8.

Figure 8:
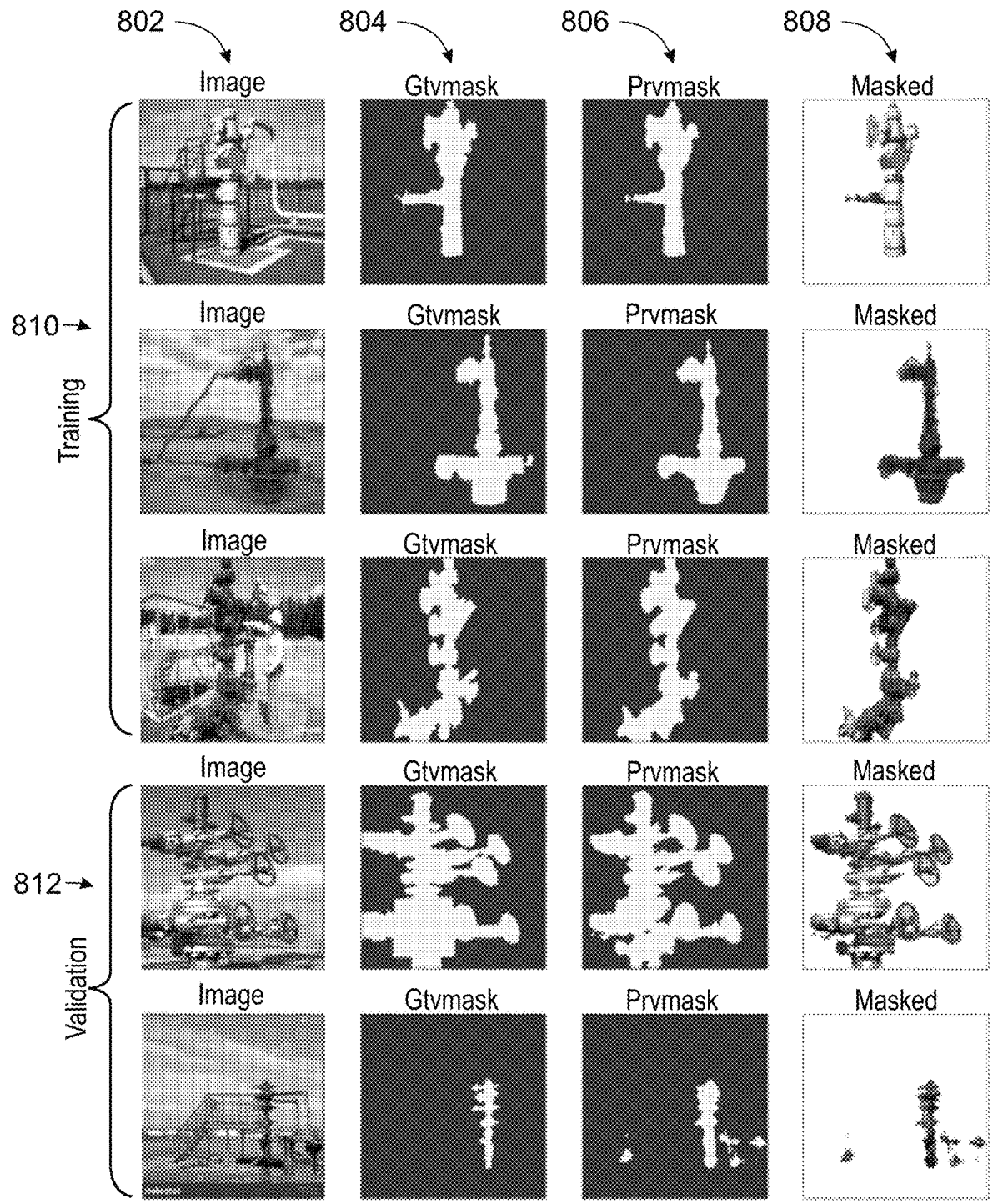
FIG. 8 shows inputs, masks, and outputs of a supervised semantic segmentation model during training and validation.

FIG. 8 shows inputs, masks, and outputs of a supervised semantic segmentation model during training and validation. In examples, the supervised semantic segmentation model is the supervised semantic segmentation model 600 of FIG. 6. FIG. 8 shows examples of supervised semantic segmentation, with training data 810 and validation data 812. Column 802 includes input wellhead images, column 804 includes ground truth label masks, column 806 includes predicted label masks, and column 808 includes extracted wellhead equipment images.

Figure 9:
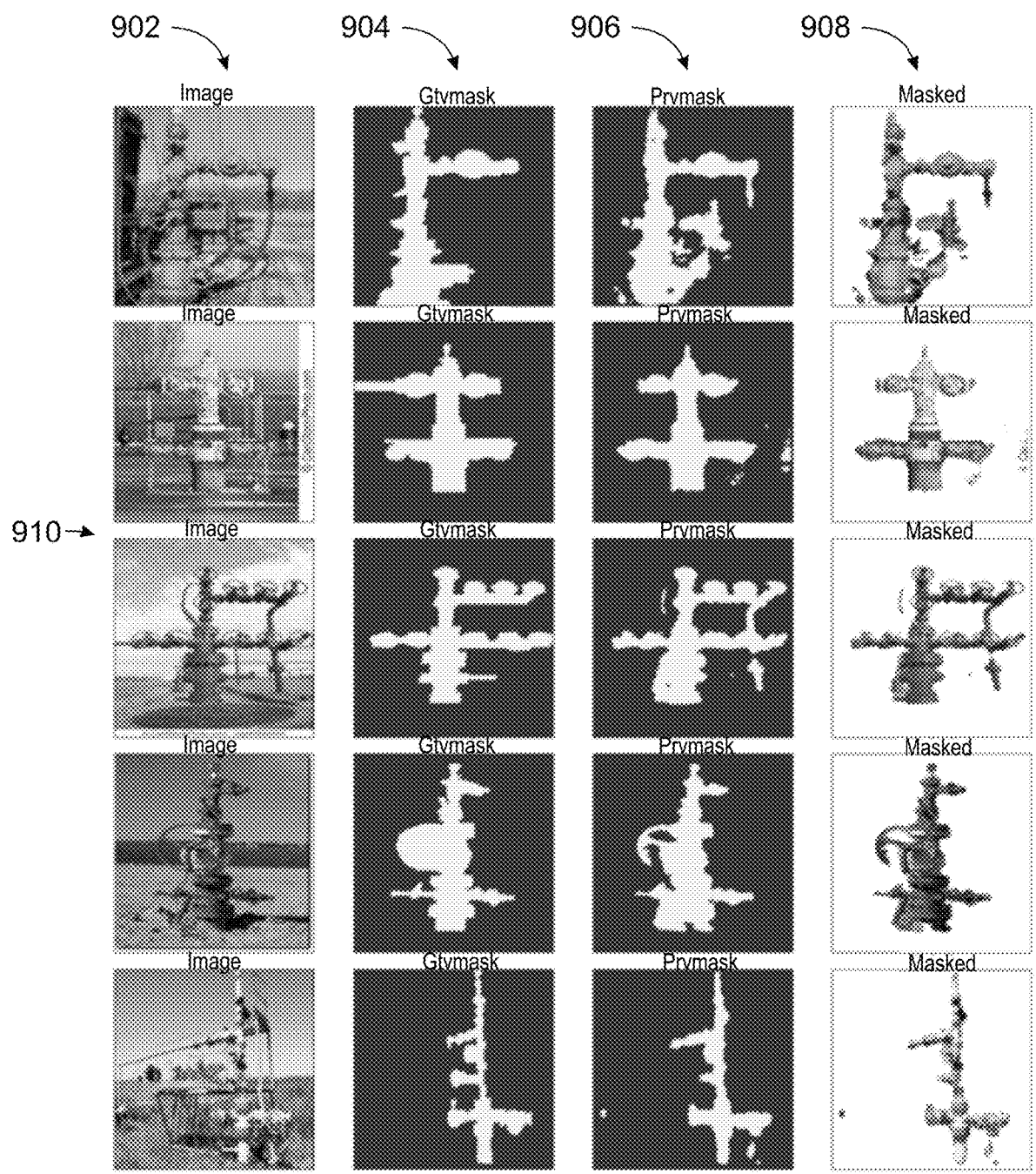
FIG. 9 shows inputs, masks, and outputs of a supervised semantic segmentation model during testing.

FIG. 9 shows inputs, masks, and outputs of a supervised semantic segmentation model during testing. In examples, the supervised semantic segmentation model is the supervised semantic segmentation model 600 of FIG. 6. FIG. 9 shows examples of supervised semantic segmentation, with testing data 910. Column 902 includes input wellhead images, column 904 includes ground truth label masks, column 906 includes predicted label masks, and column 908 includes extracted wellhead equipment images. In the examples of FIG. 8 and FIG. 9, despite the varying and often times complex background in the input images that realistically reflect well-site conditions, the extracted wellhead equipment retains its shape integrity and geometric accuracy, which is important to our task of wellhead displacement/growth detection and estimation.

Referring again to FIG. 2, object detection and segmentation models 208C are constructed. In supervised object detection, instances of wellheads in images or video frames are extracted, and location and dimension information of the wellheads are determined. In examples, object detection and segmentation models 208C include Fast R-CNN, Mask R-CNN, YOLO, MobilNet, etc. In examples, the machine learning model is a Mask R-CNN that produces object detection and segmentation simultaneously.

Figure 10:
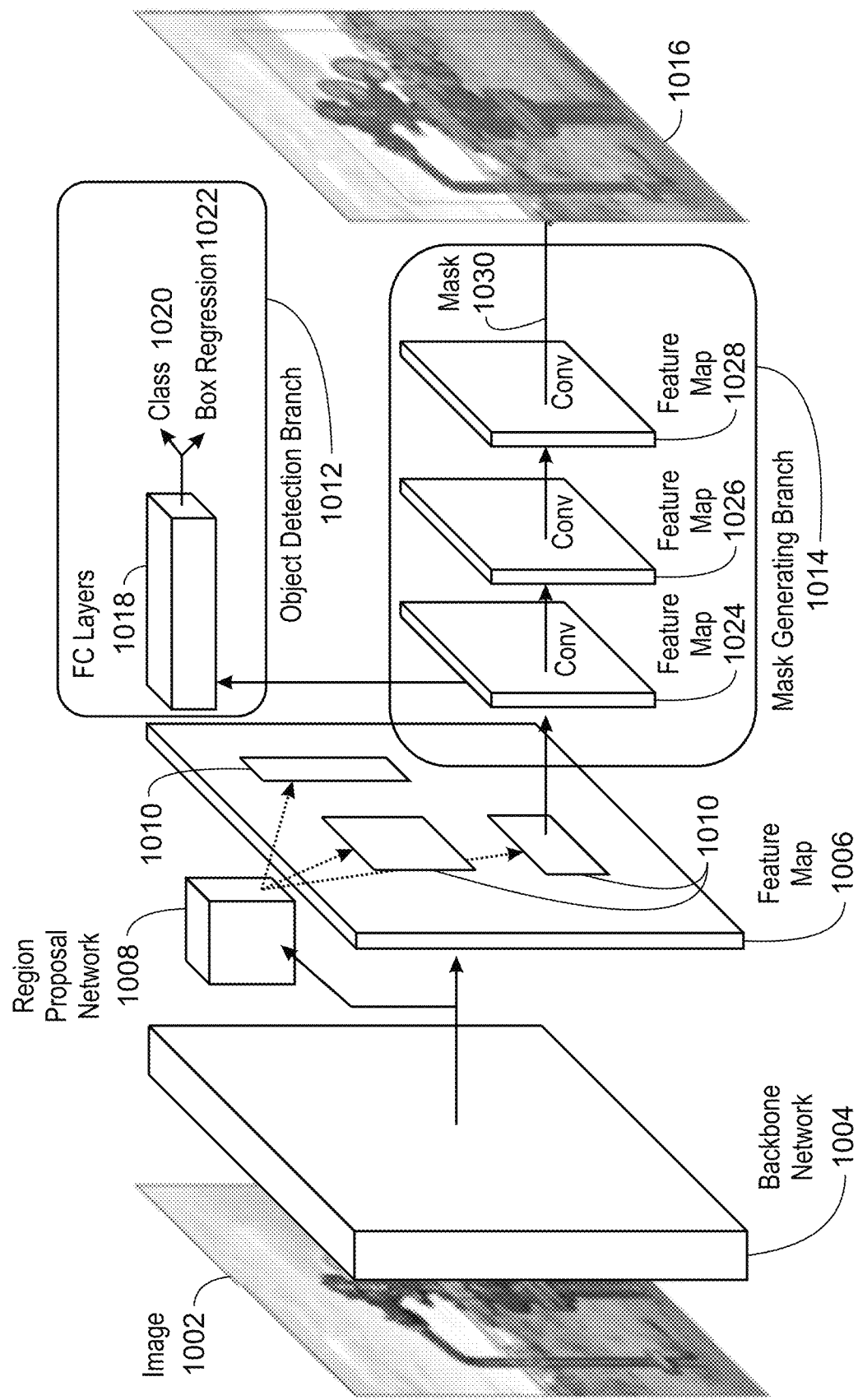
FIG. 10 shows a two stage model.

FIG. 10 shows a two stage model 1000. In examples, the two stage model 1000 is a Mask R-CNN is a two-stage model where the first stage proposes Regions of Interest and the second stage predict classes (i.e., wellhead versus the background), bounding-boxes and masks for detected objects (e.g., wellheads). In examples, Mask R-CNN produces object detection and segmentation at the same time. Wellhead instance mask generation is achieved by combining bounding-box object detection and binary mask generation, then relying on class prediction to select the mask.

As shown in FIG. 10, an image 1002 is input into the backbone network 1004 which is the main feature extractor of Mask R-CNN. In examples, the backbone network is a residual networks (ResNets); the image data goes through multiple residual bottleneck blocks, and is transformed into a feature map 1006. The feature map 1006 is output from the final convolutional layer of the backbone 1004. The feature map 1006 contains abstract information of the input image, e.g., different object instances, their classes and spatial properties. The feature map 1006 is input into a Region Proposal Network (RPN) 1008. RPN 1008 scans the feature map 1006 and proposes regions 1010 that may have objects (e.g., wellhead equipment) in them. After that, the model bifurcates into an object detection branch 1012 and a mask generation branch 1014. The object detection branch 1012 takes the regions of interest (ROI) feature map (1006, 1010) and predicts the object category, in this case either background or wellhead equipment, and a more accurate instance bounding box as illustrated by the bounding box in image 1016. The object detection branch consists of a fully connected layer that maps feature vectors into final wellhead object instance and four bounding box coordinates (e.g., four points on the image that form a bounding box). Fully connected layers 1018 output a class 1020 and box regression 1022. The mask generation branch 1014 consists of a successive sequence of convolutional network layers 1024, 1026, and 1028, where at least one convolutional layer is transposed. The mask generating branch 1014 produces output mask 1030 according to the class prediction in object detection branch. The output mask 1030 is used to generate a bounding box as shown in the image 1016. In examples, the object detection and segmentation model output is an image of the wellhead with a bounding box (e.g., image 205 of FIG. 2).

Referring again to FIG. 2, at reference number 210 the wellhead shape and its current geometric information is extracted from the output 205, 207, and 209 of computer vision models 208. In examples, the geometric information includes a height and width of the wellhead. The extracted wellhead equipment obtained from either one of these three computer vision models, as well as the bounding box coordinates determined by the object detection and segmentation model, are then combined with the dimension and perspective calibration information previously determined at reference number 204 to produce the wellhead equipment's physical dimension estimates from the image obtained at that instance.

Figure 11:
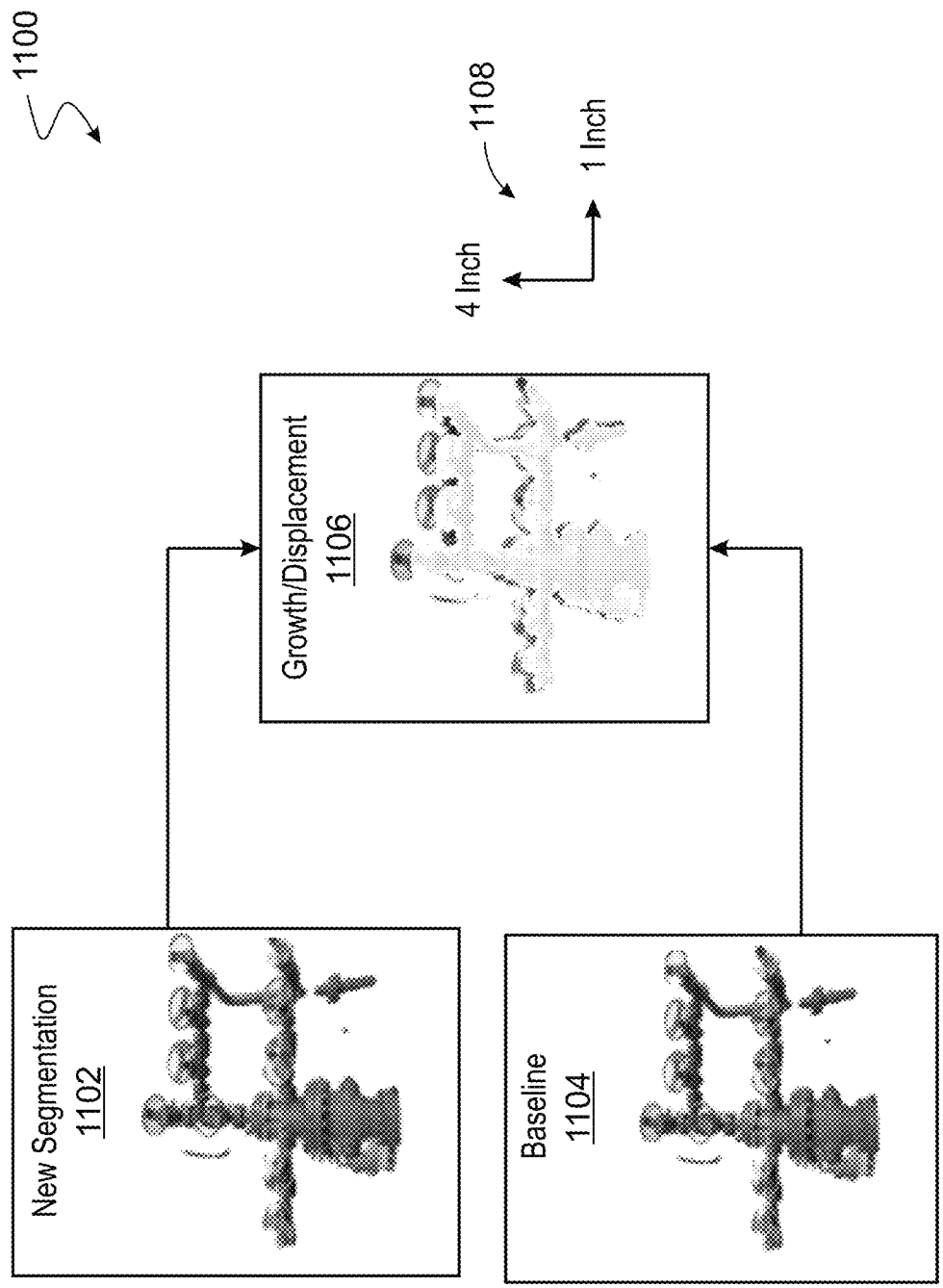
FIG. 11 shows a determination of wellhead growth.

At reference number 212, wellhead displacement/growth detection and estimation is performed. In examples, the extracted wellhead equipment image along with the calibrated physical dimension are compared with the baseline wellhead image and dimension established at reference number 204. FIG. 11 shows a determination of wellhead growth. In the example of FIG. 11, wellhead growth and displacement is calculated using cross registration with a short-time average. In examples, a short time average refers to averaging either the new wellhead image or the cross-registration output over a short time window. The short time window may be, for example, over several frames of the monitoring video. The purpose is to stabilize potentially noisy image due to normal vibration/oscillation of the well head equipment and obtain robust estimation of potential displacement. The registration process will generate such a transformation takes as input a computer vision model output (e.g., output 205, 207, or 209) and compares the output with the baseline image 1104. A determination of wellhead growth or displacement 1106 is determined via cross registration.

As shown in FIG. 11, cross registration can be done using several different ways. In examples, cross registration is performed using image cross correlation, or image cross-registration where linear transforms are allowed, such as translation and stretching. In examples, cross correlating or cross-registering the segmented new wellhead image with the baseline image will produce vertical and horizontal displacement values. In the case of cross correlation, the peak of that cross correlation will present at the location with the vertical and horizontal displacement; for cross-registration, the correct vertical and horizontal displacement minimizes a registration cost function. In examples, the registration cost function is: (i) the inverse of various similarity metrics defined between the baseline image and the new image, such as cross-correlation, mutual information and dice similarity coefficient, or (ii) the pixel averaged mean squared error (MSE) between the baseline and new image, with or without nonlinear activation for instance by sigmoidal function. The registration process will generate such a transformation that best maps the newly extracted wellhead equipment image 1102 into the baseline 1104, with accurate estimates 1108 of the amount of translation and stretch along both the vertical and horizontal directions.

Figure 12:
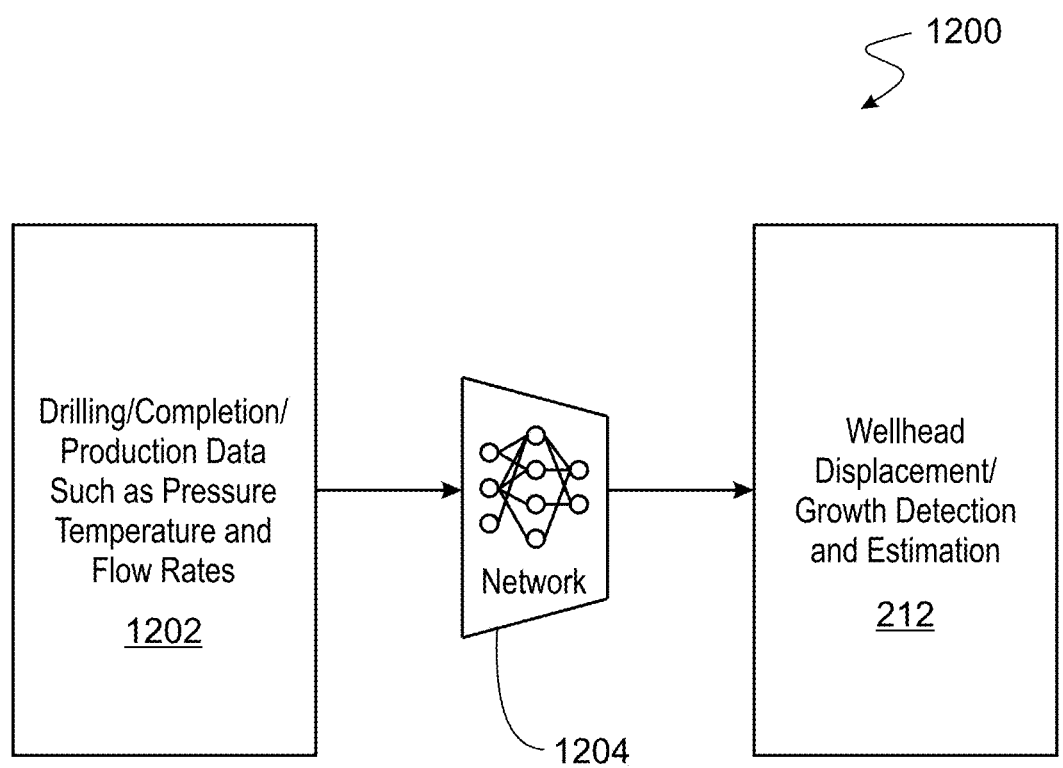
FIG. 12 shows a cross registration process.

FIG. 12 shows a cross registration process 1200. In examples, the cross registration process 1200 obtains as input drilling/completion/production data such as pressure, temperature, and flow rates at block 1202, performs wellhead displacement/growth detection and estimation 212, and outputs the wellhead growth or displacement 1106 and estimates 1108 shown in FIG. 11. In examples, the registration process 1200 predicts wellhead displacement/growth trend from drilling/completion/production data using a network 1204. In examples, performing calculations based on the extracted wellhead equipment (e.g., extracted wellhead 1102) is a significantly improved accuracy as it avoids the influence of the background or any variations in the background which occurs frequently at wellsites. In addition, assuming the displacement or growth process is a much slower process than the image or video frame rate, one way to improve robustness against any noise effect is to run a short-time average of the extracted wellhead equipment before cross-registering with the baseline, and/or averaging the calculated amount of displacement/growth directly.

In examples, wellhead growth/displacement can be caused by thermal stress in the subsurface segment of production well infrastructure. The insipient onset, development, and occurrence of wellhead growth/displacement has a strong correlation with or is caused by the produced fluid properties, such as pressure, temperature, flow rates as well as the quality of the casing/cement, and also formation properties which can be related to drilling/completion data. As a result, once cases of wellhead growth detected from image/video analysis are obtained (e.g., from reference numbers 202-208 of FIG. 2), and the corresponding data from drilling/completion/production as mentioned above is obtained, deep learning network (DNN) models can then be built, trained to direct predict wellhead growth/displacement.

Referring again to FIG. 2, at reference number 214 the wellhead displacement/growth trend is correlated with drilling/completion/production data such as pressure, temperature and flow rates to develop prediction model. In examples, a cause of wellhead displacement/growth is wellbore thermal effect induced loading. The present techniques correlate the drilling/completion/production data such as pressure, temperature and flow rates with the estimated wellhead displacement/growth data calculated as shown in FIG. 2, reference numbers 202, 204, 206, 208, 210, and 210. In some examples, the drilling/completion/production data and estimated wellhead displacement/growth data are mapped them into a regression model to provide a predictive capability, after further training and validation.

Figure 13:
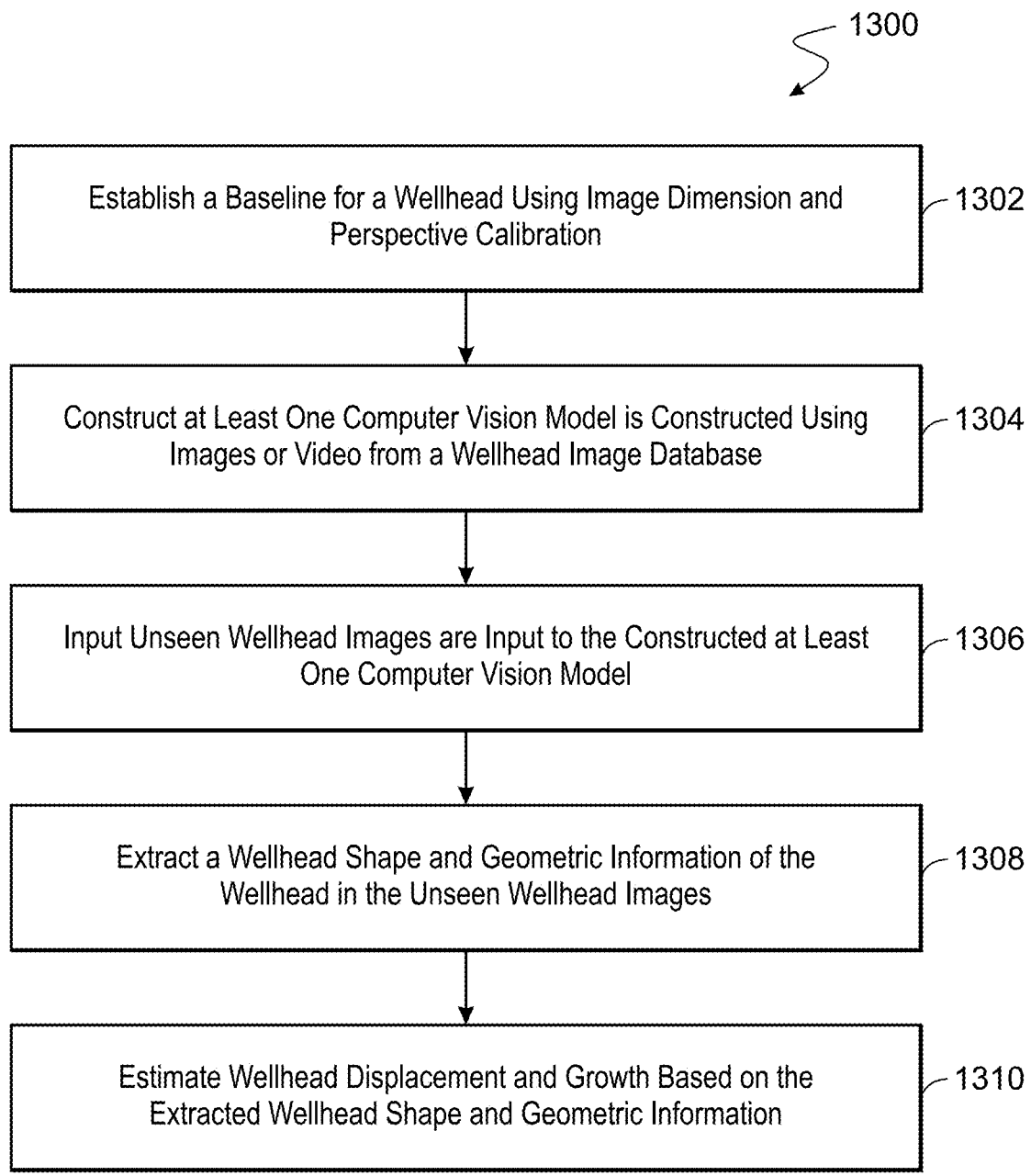
FIG. 13 is a process flow diagram of a process for automated wellhead monitoring using imaging and computer vision.

FIG. 13 is a process flow diagram of a process for automated wellhead monitoring using imaging and computer vision. In some embodiments, the machine learning models are constructed as described with respect to FIGS. 2-10. The present techniques introduce a systematic and automated procedure to assess the growth of wellheads.

At block 1302, a baseline for a wellhead using image dimension and perspective calibration is established. In examples, bassline is extracted from the initial images, the initial video, or an initial combination of images and video of the wellhead. In some embodiments, the baseline is established prior to wellhead displacement/growth.

At block 1304, at least one computer vision model is constructed using images or video from a wellhead database. Constructing the computer vision models includes, for example, building unsupervised models, training supervised models, any combinations thereof.

At block 1306, unseen wellhead images are input to the constructed at least one computer vision model. For example, the constructed computer vision models are applied to new, unseen wellhead images or video for segmentation and object detection for wellhead equipment. At block 1308, a wellhead shape and geometric information of the wellhead in the unseen wellhead images is extracted.

At block 1310, wellhead displacement and growth is estimated based on the extracted images. In examples, the extracted wellhead equipment obtained from the constructed at least one computer vision model, as well as the bounding box coordinates determined by an object detection and segmentation model, are then combined with the dimension and perspective calibration information to determine the wellhead equipment's physical dimension estimates from the image obtained at that instance. The wellhead shape and dimension information is derived from any one of the output of computer vision models. In the event of a mislabeled samples, the output of the unsupervised segmentation models are used to mitigate the potentially incorrect mask produced by the supervised segmentation model or a broken object instance predicted by the supervised object detection model. In examples, the object detection and segmentation model can indicate that the unsupervised segmentation model or the supervised segmentation model outputs belong to a same object instance. As such, the combined outputs of the computer vision models enable a more robust and accurate wellhead shape estimation and dimension prediction.

In this manner, the present techniques enable automatic detection of wellhead growth and displacement. The present techniques enable correction of wellhead growth and displacement based on the predicted correlations. Moreover, the wellhead growth and displacement according to the present techniques results in less time spent per inspection when compared to traditional techniques.

Figure 14:
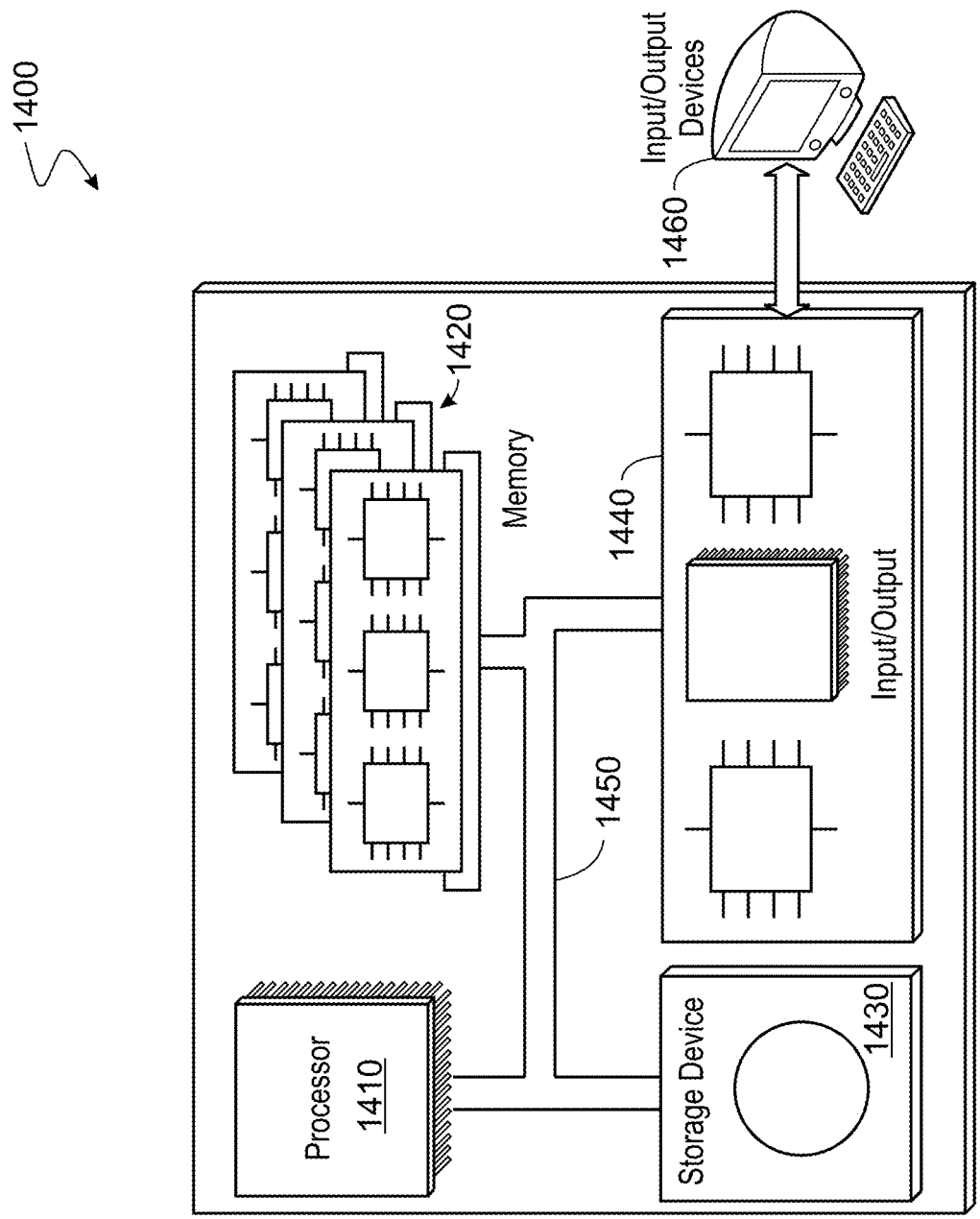
FIG. 14 is a schematic illustration of an example controller (or control system) for automated wellhead monitoring using imaging and computer vision according to the present disclosure.

FIG. 14 is a schematic illustration of an example controller 1400 (or control system) for automated wellhead monitoring using imaging and computer vision according to the present disclosure. For example, the controller 1400 may be operable according to the workflow 200 of FIG. 2. The controller 1400 is intended to include various forms of digital computers, such as printed circuit boards (PCB), processors, digital circuitry, or otherwise parts of a system for supply chain alert management. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 1400 includes a processor 1410, a memory 1420, a storage device 1430, and an input/output interface 1440 communicatively coupled with input/output devices 1460 (for example, displays, keyboards, measurement devices, sensors, valves, pumps). Each of the components 1410, 1420, 1430, and 1440 are interconnected using a system bus 1450. The processor 1410 is capable of processing instructions for execution within the controller 1400. The processor may be designed using any of a number of architectures. For example, the processor 1410 may be a CISC (Complex Instruction Set Computers) processor, a RISC (Reduced Instruction Set Computer) processor, or a MISC (Minimal Instruction Set Computer) processor.

In one implementation, the processor 1410 is a single-threaded processor. In another implementation, the processor 1410 is a multi-threaded processor. The processor 1410 is capable of processing instructions stored in the memory 1420 or on the storage device 1430 to display graphical information for a user interface on the input/output interface 1440.

The memory 1420 stores information within the controller 1400. In one implementation, the memory 1420 is a computer-readable medium. In one implementation, the memory 1420 is a volatile memory unit. In another implementation, the memory 1420 is a nonvolatile memory unit.

The storage device 1430 is capable of providing mass storage for the controller 1400. In one implementation, the storage device 1430 is a computer-readable medium. In various different implementations, the storage device 1430 may be a floppy disk device, a hard disk device, an optical disk device, or a tape device.

The input/output interface 1440 provides input/output operations for the controller 1400. In one implementation, the input/output devices 1460 includes a keyboard and/or pointing device. In another implementation, the input/output devices 1460 includes a display unit for displaying graphical user interfaces.

There can be any number of controllers 1400 associated with, or external to, a computer system containing controller 1400, with each controller 1400 communicating over a network. Further, the terms "client," "user," and other appropriate terminology can be used interchangeably, as appropriate, without departing from the scope of the present disclosure. Moreover, the present disclosure contemplates that many users can use one controller 1400 and one user can use multiple controllers 1400.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship. Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer-implemented method for automated wellhead monitoring, the method comprising:
   establishing, using at least one hardware processor, a baseline for a wellhead using image dimension and perspective calibration;

constructing, using the at least one hardware processor, at least one computer vision model using images or video from a wellhead database;

inputting, using the at least one hardware processor, unseen wellhead images to the constructed at least one computer vision model;

extracting, using the at least one hardware processor, a wellhead shape and geometric information of the wellhead in the unseen wellhead images; and estimating, using the at least one hardware processor, wellhead displacement and growth based on the extracted wellhead shape and geometric information.

2. The computer implemented method of claim 1, wherein the wellhead database includes images of wellheads labeled with wellhead segmentation annotations or bounding boxes.

3. The computer implemented method of claim 1, wherein the wellhead shape and geometric information comprises height and width of the wellhead.

4. The computer implemented method of claim 1, wherein the at least one computer vision model is constructed by training supervised segmentation models.

5. The computer implemented method of claim 1, wherein the at least one computer vision model is constructed by training object detection and segmentation models.

6. The computer implemented method of claim 1, wherein the at least one computer vision model is constructed by building unsupervised segmentation models.

7. The computer implemented method of claim 1, further comprising:
    determining dimension and perspective calibration information; and
    combining the extracted wellhead shape and geometric information to estimate wellhead displacement and growth.

8. An apparatus comprising a non-transitory, computer readable, storage medium that stores instructions that, when executed by at least one processor, cause the at least one processor to perform operations comprising:
    establishing a baseline for a wellhead using image dimension and perspective calibration;
    constructing at least one computer vision model using images or video from a wellhead database;
    inputting unseen wellhead images to the constructed at least one computer vision model;
    extracting a wellhead shape and geometric information of the wellhead in the unseen wellhead images; and
    estimating wellhead displacement and growth based on the extracted wellhead shape and geometric information.

9. The apparatus of claim 8, wherein the wellhead database includes images of wellheads labeled with wellhead segmentation annotations or bounding boxes.

10. The apparatus of claim 8, wherein the wellhead shape and geometric information comprises height and width of the wellhead.

11. The apparatus of claim 8, wherein the at least one computer vision model is constructed by training supervised segmentation models.

12. The apparatus of claim 8, wherein the at least one computer vision model is constructed by training object detection and segmentation models.

13. The apparatus of claim 8, wherein the at least one computer vision model is constructed by building unsupervised segmentation models.

14. The apparatus of claim 8, further comprising:
    determining dimension and perspective calibration information; and
    combining the extracted wellhead shape and geometric information to estimate wellhead displacement and growth.

15. A system, comprising:
    one or more memory modules;
    one or more hardware processors communicably coupled to the one or more memory modules, the one or more hardware processors configured to execute instructions stored on the one or more memory modules to perform operations comprising:
    establishing a baseline for a wellhead using image dimension and perspective calibration;
    constructing at least one computer vision model using images or video from a wellhead database;
    inputting unseen wellhead images to the constructed at least one computer vision model;
    extracting a wellhead shape and geometric information of the wellhead in the unseen wellhead images; and
    estimating wellhead displacement and growth based on the extracted wellhead shape and geometric information.

16. The system of claim 15, wherein the wellhead database includes images of wellheads labeled with wellhead segmentation annotations or bounding boxes.

17. The system of claim 15, wherein the wellhead shape and geometric information comprises height and width of the wellhead.

18. The system of claim 15, wherein the at least one computer vision model is constructed by training supervised segmentation models.

19. The system of claim 15, wherein the at least one computer vision model is constructed by training object detection and segmentation models.

20. The system of claim 15, wherein the at least one computer vision model is constructed by building unsupervised segmentation models.

* * * * *